US012531777B2

(12) United States Patent
Nayak et al.

(10) Patent No.: US 12,531,777 B2
(45) Date of Patent: Jan. 20, 2026

(54) OPTIMIZATION OF COMMUNICATION BETWEEN NETWORK DEVICES USING WIRELESS REDUNDANCY

(71) Applicant: Fortinet, Inc., Sunnyvale, CA (US)

(72) Inventors: Sharathraj Nayak, Karnataka (IN); Venkatesh Kannan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 379 days.

(21) Appl. No.: 18/129,824

(22) Filed: Mar. 31, 2023

(65) Prior Publication Data

US 2024/0333579 A1    Oct. 3, 2024

(51) Int. Cl.
*H04L 41/0654* (2022.01)
*H04W 24/04* (2009.01)
*H04W 84/12* (2009.01)

(52) U.S. Cl.
CPC ......... *H04L 41/0654* (2013.01); *H04W 24/04* (2013.01); *H04W 84/12* (2013.01)

(58) Field of Classification Search
CPC .... H04L 41/0654; H04W 24/04; H04W 84/12
See application file for complete search history.

(56) References Cited

U.S. PATENT DOCUMENTS

| 2008/0013474 A1* | 1/2008 | Nagarajan | ........... H04L 12/4633 370/321 |
| 2015/0207724 A1* | 7/2015 | Choudhury | ............. H04L 45/42 370/255 |

\* cited by examiner

*Primary Examiner* — Asad M Nawaz
*Assistant Examiner* — Natali Pascual Peguero
(74) *Attorney, Agent, or Firm* — Law Office of Dorian Cartwright; Dorian Cartwright

(57) ABSTRACT

A downstream wired port receives network packets over the at least one or more downstream wired port. An upstream routing table, responsive the failure of the at least one of the one or more upstream wired ports, in this embodiment, determines whether a valid route for the network packets exists over the upstream network device. The upstream routing table, responsive to determining that a valid route exists, redirects the network packets for the failed upstream wired port to the upstream Wi-Fi port.

5 Claims, 6 Drawing Sheets

OPTIMIZATION OF COMMUNICATION BETWEEN NETWORK DEVICES USING WIRELESS REDUNDANCY

FIELD OF THE INVENTION

The invention relates generally to computer networks, and more specifically, to an L2/L3 switch for using Wi-Fi for redundancy of failed upstream ports.

BACKGROUND

A backboned network typically relies upon wired connections for reliability and ease of use. In prior art FIG. 1, a router 10 has direct links to each of switches 20A-D. In turn, each of switches 20A-D has multiple redundant connections to each other in case of a failure of a router link. As the backbone network increases in size with more network devices, the wired redundancy becomes more and more complex.

What is needed is a robust technique for an L2/L3 switch for using Wi-Fi for redundancy of failed upstream ports.

SUMMARY

To meet the above-described needs, methods, computer program products, and systems for an L2/L3 switch for using Wi-Fi for redundancy of failed upstream ports.

In one embodiment, an uplink status for each of one or more upstream wired ports between, for example an L2/L3 switch (or other network device, such as an access point or router) and a network device upstream from the L2/L3 switch is monitored. The L2/L3 switch also has an upstream Wi-Fi port comprising at least one Wi-Fi transceiver. The L2/L3 switch has one or more downstream wired ports between the L2/L3 switch and a network devices downstream from the L2/L3 switch. A failure can be detected in at least one of the one or more upstream wired ports.

In another embodiment, the downstream wired port 320 receives network packets over the at least one or more downstream wired port. An upstream routing table 330, responsive the failure of the at least one of the one or more upstream wired ports, in this embodiment, determines whether a valid route for the network packets exists over the upstream network device. The upstream routing table, responsive to determining that a valid route exists, redirects the network packets for the failed upstream wired port to the upstream Wi-Fi port.

In still another embodiment, the uplink Wi-Fi port transmits the network packets to the upstream network device, over the upstream Wi-Fi port. In an embodiment, transmissions are transferred back to the uplink wired ports 310 once the failure is cured.

Advantageously, network performance and computer performance are improved with better redundancy of wired backbone links.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for automatically laying out security zone policies for IT and OT devices in a hybrid enterprise network including an IT segment and an OT segment. One of ordinary skill in the art will recognize many alternative embodiments that are not explicitly listed based on the following disclosure.

I. Network Devices with Wi-Fi Ports for Backbone Redundancy (FIGS. 2-3)

Figure 2A:
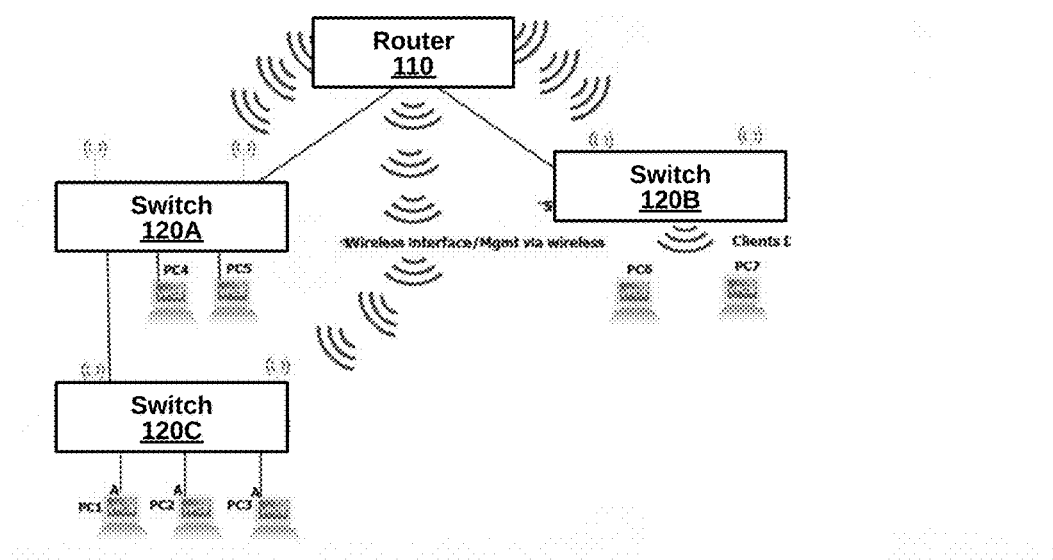
FIGS. 2A-C are high-level block diagrams of a backbone network including an L2/L3 switch using Wi-Fi for redundancy of failed upstream ports in a backbone wired network, according to one embodiment.
Figure 2B:
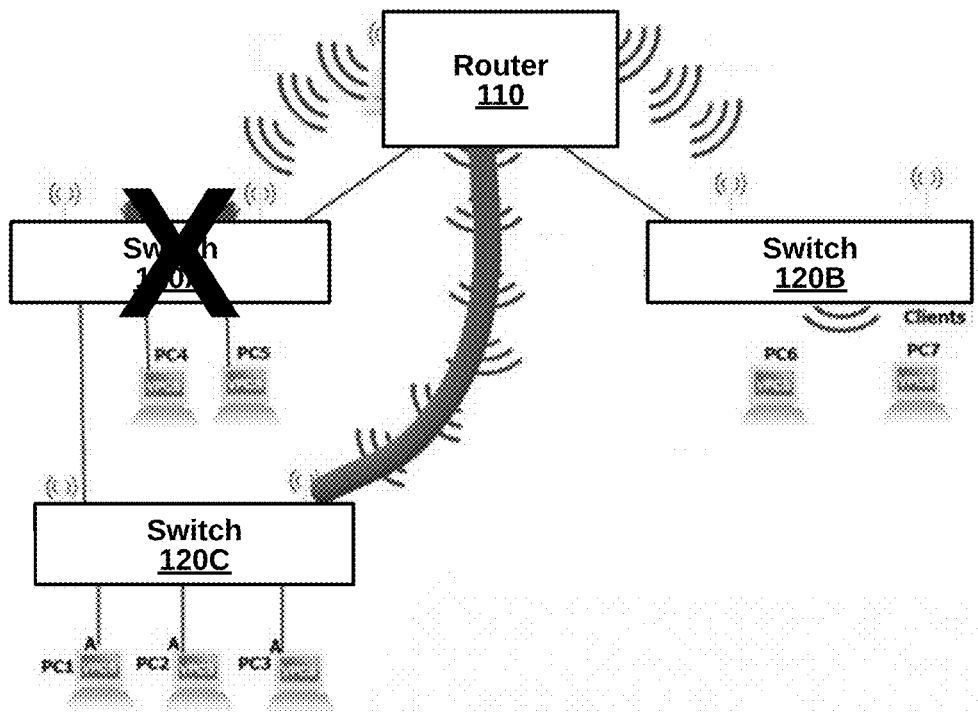
Figure 2C:
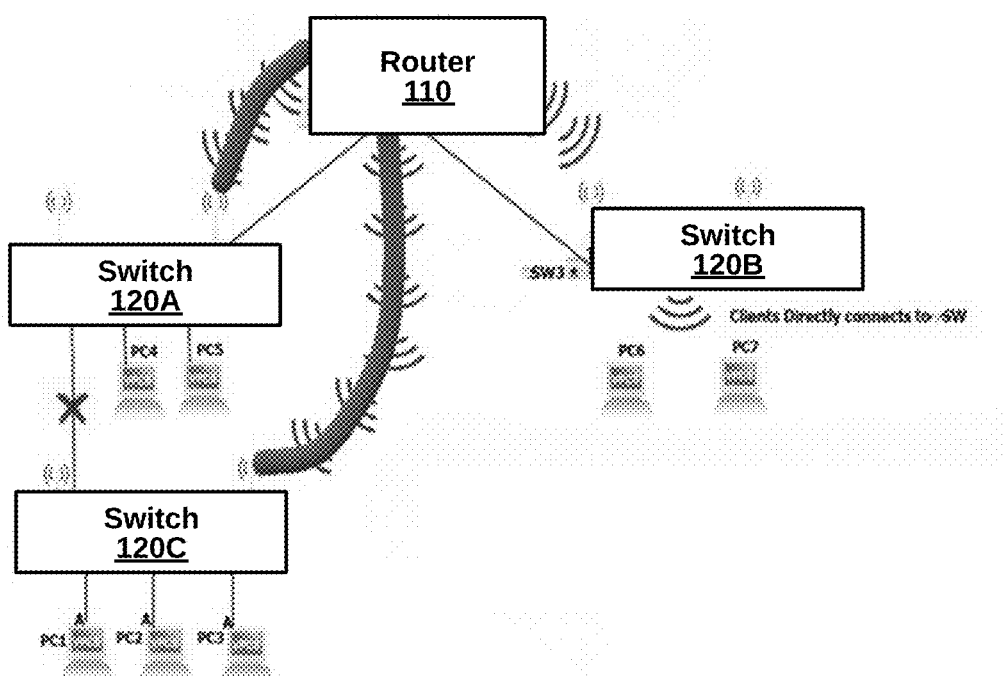

FIGS. 2A-C are a high-level block diagram illustrating a backbone wired network with L2/L3 switch using Wi-Fi for redundancy of failed upstream ports according to one embodiment. FIG. 2A shows Wi-Fi redundancy for wired links, and active Wi-Fi redundancy is shown in FIG. 2B due to a failed switch and in FIG. 2C due to a failed link. Other variations are possible. A router 120 is coupled to switches 120A and 120B by wire, and switch 120B is coupled to switch 120C by wire. The switches 120A-C are in turn coupled by wire or wirelessly to stations. The router 110 can be coupled by wire upstream to a gateway, a firewall or other network device. Redundant Wi-Fi coupling also exists between the network devices of the backbone network. Other embodiments of the backbone wired network can include additional components that are not shown in FIG. 2A, such as controllers, network gateways, access points, firewalls, and additional routers and switches. The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

Figure 1:
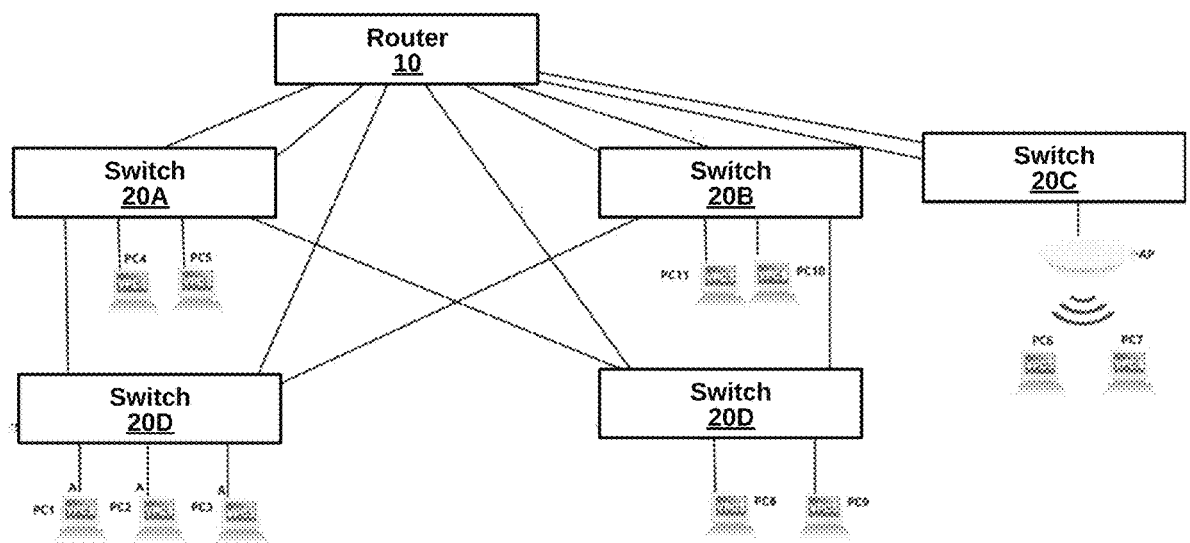
FIG. 1 is a prior art block diagram illustrating conventional redundancy in a backbone wired network.
Figure 3:
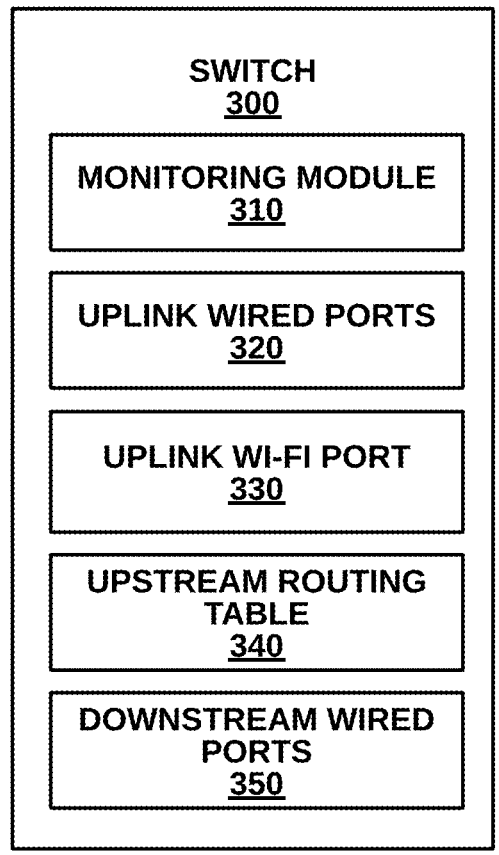
FIG. 3 is a more detailed block diagram illustrating a network device, in this case a switch, of the system of FIG. 2, according to one embodiment.

FIG. 3 is a more detailed block diagram illustrating the network device, implemented as switch 300, of the system of FIG. 1, according to one embodiment. The switch 300 includes a monitoring module, uplink wired ports 320, an uplink Wi-Fi port 330 for redundancy, an upstream routing table 340 and downstream wired ports 350. The components can be implemented in hardware, software, or a combination of both.

The monitoring module 310 to monitor an uplink status for each of one or more upstream wired ports between the L2/L3 switch and a network device upstream from the L2/L3 switch, wherein the L2/L3 switch also has an upstream Wi-Fi port comprising at least one Wi-Fi transceiver, and wherein the L2/L3 switch has one or more downstream wired ports between the L2/L3 switch and a network devices downstream from the L2/L3 switch. The monitoring module 310 can eventually detect a failure in at least one of the one or more upstream wired ports.

The downstream wired port 320 receives network packets over the at least one or more downstream wired ports.

The upstream routing table 330, responsive the failure of the at least one of the one or more upstream wired ports, in this embodiment, determines whether a valid route for the network packets exists over the upstream network device. The upstream routing table 220, responsive to determining that a valid route exists, redirects the network packets for the failed upstream wired port to the upstream Wi-Fi port.

The uplink Wi-Fi port 320 transmits the network packets to the upstream network device, over the upstream Wi-Fi port. In an embodiment, transmissions are transferred back to the uplink wired ports 310 once the failure is cured.

II. Methods in Network Devices with Wi-Fi Ports for Backbone Redundancy (FIGS. 4-5)

Figure 4:
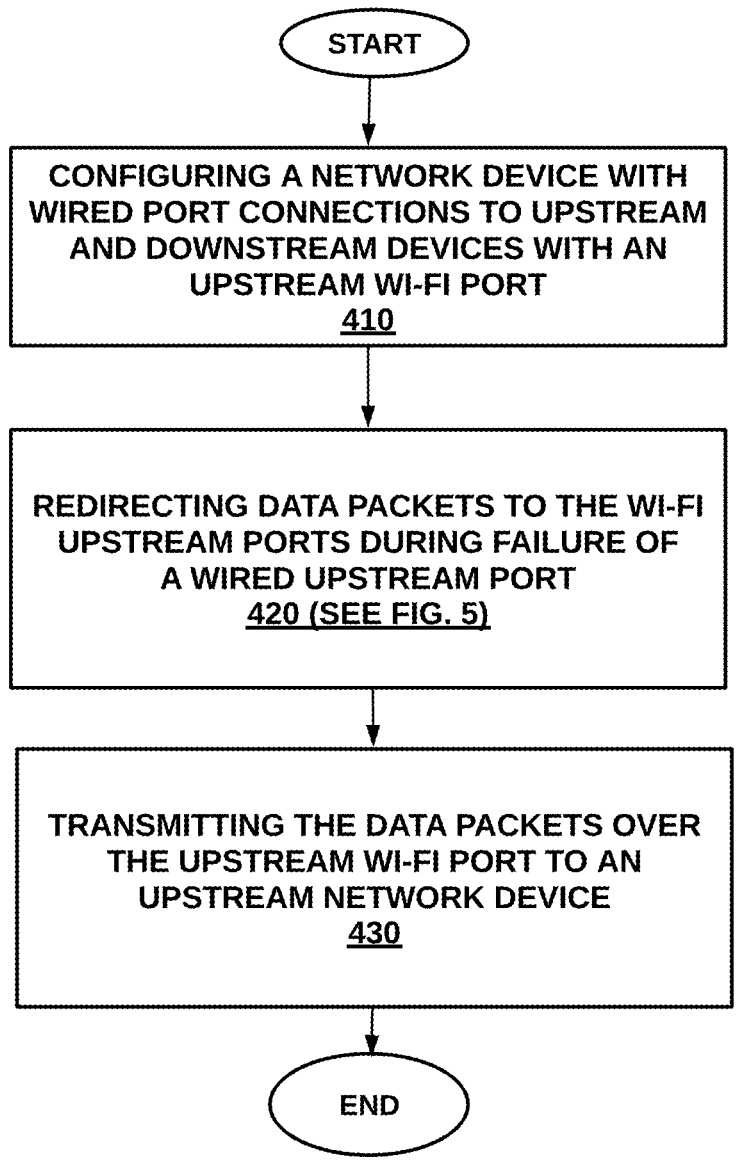
FIG. 4 is a high-level flow diagram illustrating a method in an L2/L3 switch for using Wi-Fi for redundancy of failed upstream ports, according to one embodiment.

FIG. 4 is a high-level flow diagram illustrating a method 400 in an L2/L3 switch for using Wi-Fi for redundancy of failed upstream ports, according to an embodiment.

At step 410, a network device is configured with wired port connections to upstream and downstream network devices. A Wi-Fi port provides redundancy to an upstream network device. In other embodiments, Wi-Fi downstream ports also provide redundance to downstream devices. At step 420, data packets are redirected to the upstream Wi-Fi ports during failure of a upstream wired port, as described further below in association with FIG. 5. At step 430, data packets are transmitted over the upstream Wi-Fi port to an upstream network device.

Figure 5:
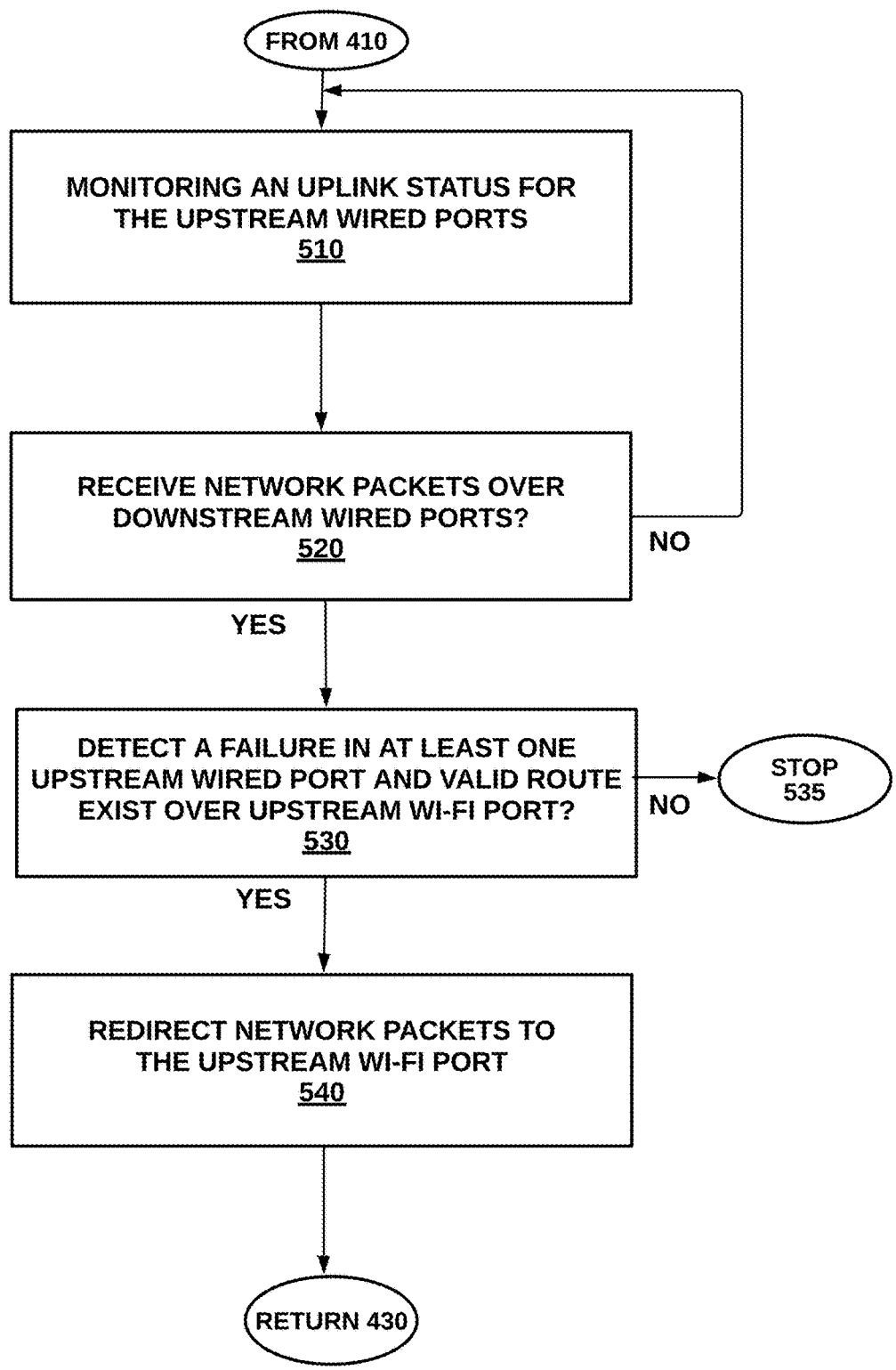
FIG. 5 is a more detailed flow diagram illustrating a step for redirecting data packets to Wi-Fi upstream ports during failure of wired upstream ports, from the method of FIG. 4, according to an embodiment.

FIG. 5 is a more detailed flow diagram illustrating the step 320 for redirecting data packets to the Wi-Fi upstream ports, according to an embodiment.

At step 510, an uplink status is monitored for each of one or more upstream wired ports between the L2/L3 switch and a network device upstream from the L2/L3 switch. Also, the L2/L3 switch has an upstream Wi-Fi port comprising at least one Wi-Fi transceiver. The L2/L3 switch has one or more downstream wired ports between the L2/L3 switch and a network devices downstream from the L2/L3 switch.

At step 520, data packets are received over downstream wired ports.

Responsive the failure of the at least one of the one or more upstream wired ports, at step 530 if a failure is detected in an upstream wired port and a valid route for the network packets exists over the upstream network device, at step 530, the network packets for the failed upstream wired port are redirected to the upstream Wi-Fi port. However, if there is no failure or no valid route for redirection when failure is detected, the process stops. In some embodiments, a different process is initiated, such as a transmission error process or a retransmission process.

III. Computing Device for Wi-Fi Ports for Backbone Redundancy (FIG. 6)

Figure 6:
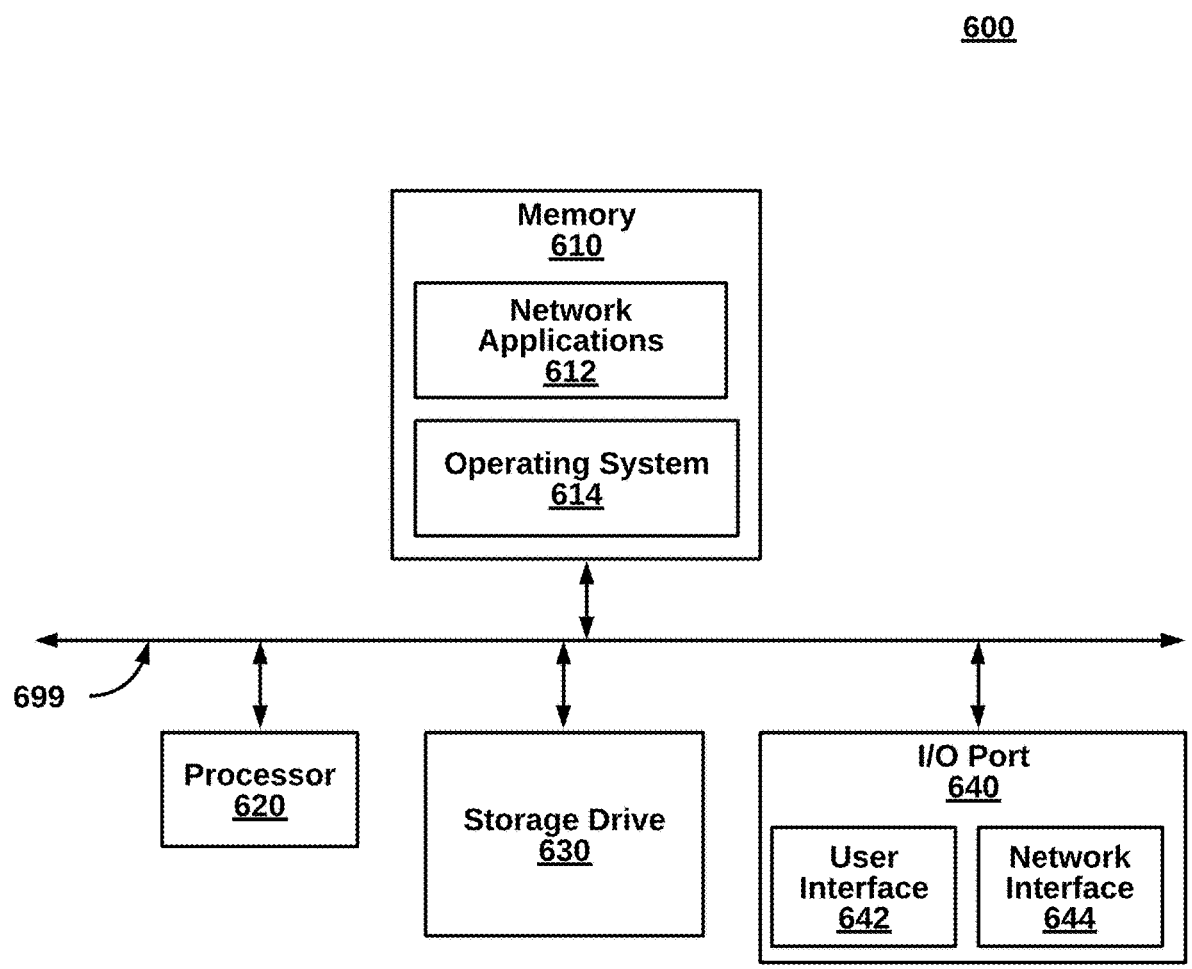
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including router 110 and switches 120A-D. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications 612 can include a web browser (e.g., browser 125), a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in an L2/L3 switch for using Wi-Fi for redundancy of failed upstream ports, the method comprising:

monitoring an uplink status for each of one or more upstream wired ports between the L2/L3 switch and a network device upstream from the L2/L3 switch, wherein the L2/L3 switch also has an upstream Wi-Fi port comprising at least one Wi-Fi transceiver, and wherein the L2/L3 switch has one or more downstream wired ports for connectivity between the L2/L3 switch and network devices downstream from the L2/L3 switch;

detecting a failure in at least one of the one or more upstream wired ports;

receiving network packets over the at least one or more downstream wired ports;

responsive the failure of the at least one of the one or more upstream wired ports, determining whether a valid route for the network packets exists over the upstream network device;

responsive to determining that a valid route exists, redirecting the network packets for the failed upstream wired port to the upstream Wi-Fi port; and transmitting the network packets to the upstream network device, over the upstream Wi-Fi port.

2. The method of claim 1, wherein the L2/L3 switch include an upstream routing table with a route to the upstream network device.

3. The method of claim 1, further comprising: detecting a recovery from the failure in the at least one or more upstream wire ports, and in response, resuming transmission of data packets to the upstream network device over the at least one or more upstream wire ports.

4. A non-transitory computer-readable medium in an L2/L3 switch for using Wi-Fi for redundancy of failed upstream ports, the method comprising:

monitoring an uplink status for each of one or more upstream wired ports between the L2/L3 switch and a network device upstream from the L2/L3 switch, wherein the L2/L3 switch also has an upstream Wi-Fi port comprising at least one Wi-Fi transceiver, and wherein the L2/L3 switch has one or more downstream wired ports for connectivity between the L2/L3 switch and a network devices downstream from the L2/L3 switch;

detecting a failure in at least one of the one or more upstream wired ports;

receiving network packets over the at least one or more downstream wired ports;

responsive the failure of the at least one of the one or more upstream wired ports, determining whether a valid route for the network packets exists over the upstream network device;

responsive to determining that a valid route exists, redirecting the network packets for the failed upstream wired port to the upstream Wi-Fi port; and transmitting the network packets to the upstream network device, over the upstream Wi-Fi port.

5. An L2/L3 switch for using Wi-Fi for redundancy of failed upstream ports, the L2/L3 switch comprising:

a processor;

a network interface communicatively coupled to the processor and to the hybrid enterprise network; and a memory, communicatively coupled to the processor and storing source code that is executed by the processor, comprising:
- a monitoring module to monitor an uplink status for each of one or more upstream wired ports between the L2/L3 switch and a network device upstream from the L2/L3 switch, wherein the L2/L3 switch also has an upstream Wi-Fi port comprising at least one Wi-Fi transceiver, and wherein the L2/L3 switch has one or more downstream wired ports for connectivity between the L2/L3 switch and a network devices downstream from the L2/L3 switch wherein the monitoring module detects a failure in at least one of the one or more upstream wired ports;
- a downstream wired port to receive network packets over the at least one or more downstream wired ports; and
- an upstream routing table, responsive the failure of the at least one of the one or more upstream wired ports, to determine whether a valid route for the network packets exists over the upstream network device,
- wherein the upstream routing table, responsive to determining that a valid route exists, redirects the network packets for the failed upstream wired port to the upstream Wi-Fi port,
- wherein the uplink Wi-Fi port to transmit the network packets to the upstream network device, over the upstream Wi-Fi port.

* * * * *